Figure 1:
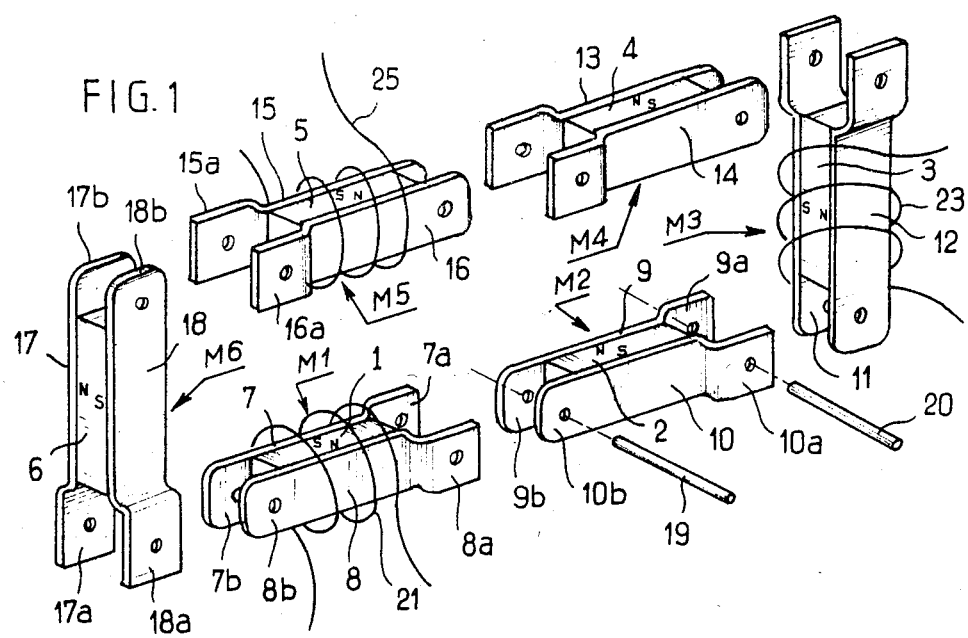

United States Patent [19]

Koehler

[11] Patent Number: 4,556,858
[45] Date of Patent: Dec. 3, 1985

[54] BISTABLE ELECTROMAGNET WITH SEVERAL ARMATURES COMPRISING A PERMANENT MAGNET

[75] Inventor: Gérard Koehler, Ville d'Avray, France

[73] Assignee: La Telemecanique Electrique, Nanterre, France

[21] Appl. No.: 666,312

[22] Filed: Oct. 30, 1984

[30] Foreign Application Priority Data

Nov. 16, 1983 [FR] France ................. 83 18186

[51] Int. Cl.⁴ .............................................. H01F 7/08
[52] U.S. Cl. .................................... 335/234; 335/81; 335/267
[58] Field of Search ....................... 335/78, 79, 80, 81, 335/85, 229, 230, 234, 266, 267, 268

[56] References Cited

U.S. PATENT DOCUMENTS 3,995,243 11/1976 Malmborg ................. 335/81 X
4,195,277 3/1980 Leicht ........................... 335/229
4,316,167 2/1982 Koehler .................. 335/234 X

*Primary Examiner*—George Harris
*Attorney, Agent, or Firm*—Young & Thompson

[57] ABSTRACT

The bistable electromagnet comprises a magnetic circuit partially surrounded by a winding constituted by a series of links (M1, M2, M3, M4, M5, M6) interconnected by air gaps, the links of a first type being movable relative to the other links of a second type, certain types of links comprising a permanent magnet (1, 3, 5, ...) provided on its pole surfaces with pole pieces (7, 8; 11, 12; 15, 16; ...) whose ends define two air gap zones with the neighboring links of the other type.

Each permanent magnet (1, 3, 5) of one type of link (M1, M3, M5) is subjected to the influence of a winding (21, 23, 25) whose field is perpendicular to the magnetic direction of said permanent magnet and directed toward one or the other of the ends of its pole pieces and the links of the first type (M2, M4, M6) comprise also a permanent magnet (2, 4, 6) provided with pole pieces, such that the electromagnet will have the form of a closed chain, which can follow a variable path within a plane and can give rise, along its length, to forces perpendicular to this plane.

Used particularly in bistable electromagnet clutches. (See FIG. 1).

12 Claims, 5 Drawing Figures

BISTABLE ELECTROMAGNET WITH SEVERAL ARMATURES COMPRISING A PERMANENT MAGNET

The present invention relates to a bistable electromagnet comprising several armatures which comprise a permanent magnet.

According to French Pat. No. 2,388,386, there is known an electromagnet comprising an armature of H section which, during operation of the electromagnet, moves along the axis of a magnet disposed at the center of the H of the armature. This electromagnet comprises according to the circumstances two armatures disposed in series, the connections between the air gaps defined by the pole pieces of these armatures being defined by yokes.

German Pat. No. 2,407,184 discloses an electromagnet comprising two armatures of H section disposed in series and rotatable during operation of the electromagnet. The air gaps of these armatures are provided by cores surrounded by a winding.

French Pat. Nos. 2,293,044 and 2,298,866 disclose an electromagnet having a series of air gaps disposed between two coaxial pole pieces in the form of a helix, one of the latter comprising a permanent magnet while the other carries a winding. The arrangement is such as to obtain translatory movement between the two coaxial pieces.

The drawbacks of these known electromagnets reside above all in the fact that they give rise to large flux losses by the yokes, because the ampere turns are concentrated only in a small part of the magnetic circuit.

Moreover, the mechanical forces engendered during operation of these electromagnets are available only in one or two predetermined places of these latter, whereby the forces are difficult to distribute.

Furthermore, the windings are located far from the magnets, and thus are inefficient.

The known electromagnets on the other hand have a volume which is difficult to adapt to the particular available spaces, such as tori of low height.

Certain electromagnets are used to control monostable clutches. These latter present problems of mechanical and electrical overheating and wear of the connecting bands.

The aim of the present invention is to overcome the drawbacks of the known devices.

The bistable electromagnet contemplated by the invention, comprises a magnetic circuit partially surrounded by a winding and is constituted by a series of links interconnected by air gaps, the links of a first type being movable relative to the other links of a second type, certain types of links comprising a permanent magnet provided on its pole faces with pole pieces whose ends define two air gap regions with the neighboring links of the other type, each air gap region being susceptible to give rise alternatively to two opposite forces whose directions are parallel to the directions of magnetization of the permanet magnets, two forces generated simultaneously by the same link after excitation in one given direction of the winding being of the same direction.

According to the invention, this electromagnet is characterized in that each permanent magnet of one type of link is subjected to the influence of the winding whose field is perpendicular to the magnetization direction of said permanent magnet and directed toward one or the other of the ends of the pole pieces with which this magnet is provided, whereby the electromagnet will have the form of a closed chain, which can follow a variable path in a plane and can give rise, along its length, to forces perpendicular to this plane.

Thus, when the windings of the links of a certain type are excited, the links of the other type undergo translation perpendicular to the plane of the closed loop formed by the electromagnet and of an amplitude equal to the play between neighboring links.

Thanks to the invention, it is possible to distribute the forces in a regular fashion about the path corresponding to the closed loop formed by the electromagnet.

The electromagnet according to the invention may be used to advantage but without limitation in a bistable clutch in which the forces are regularly distributed about the periphery of the driven plate, the bistable operation of the electromagnet being particularly adapted to ensure the engagement and disengagement without a return spring, nor an abutment susceptible to wear.

Other characteristics and advantages of the invention will become apparent from the following description.

Figure 2:
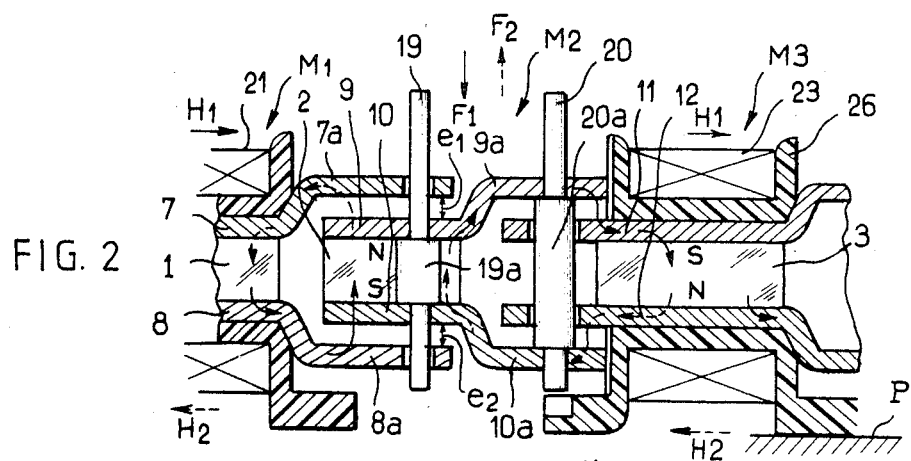
Figure 3:
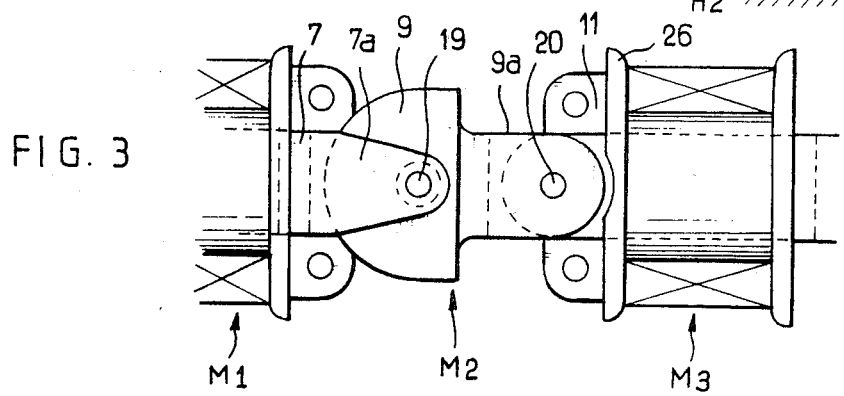
Figure 4:
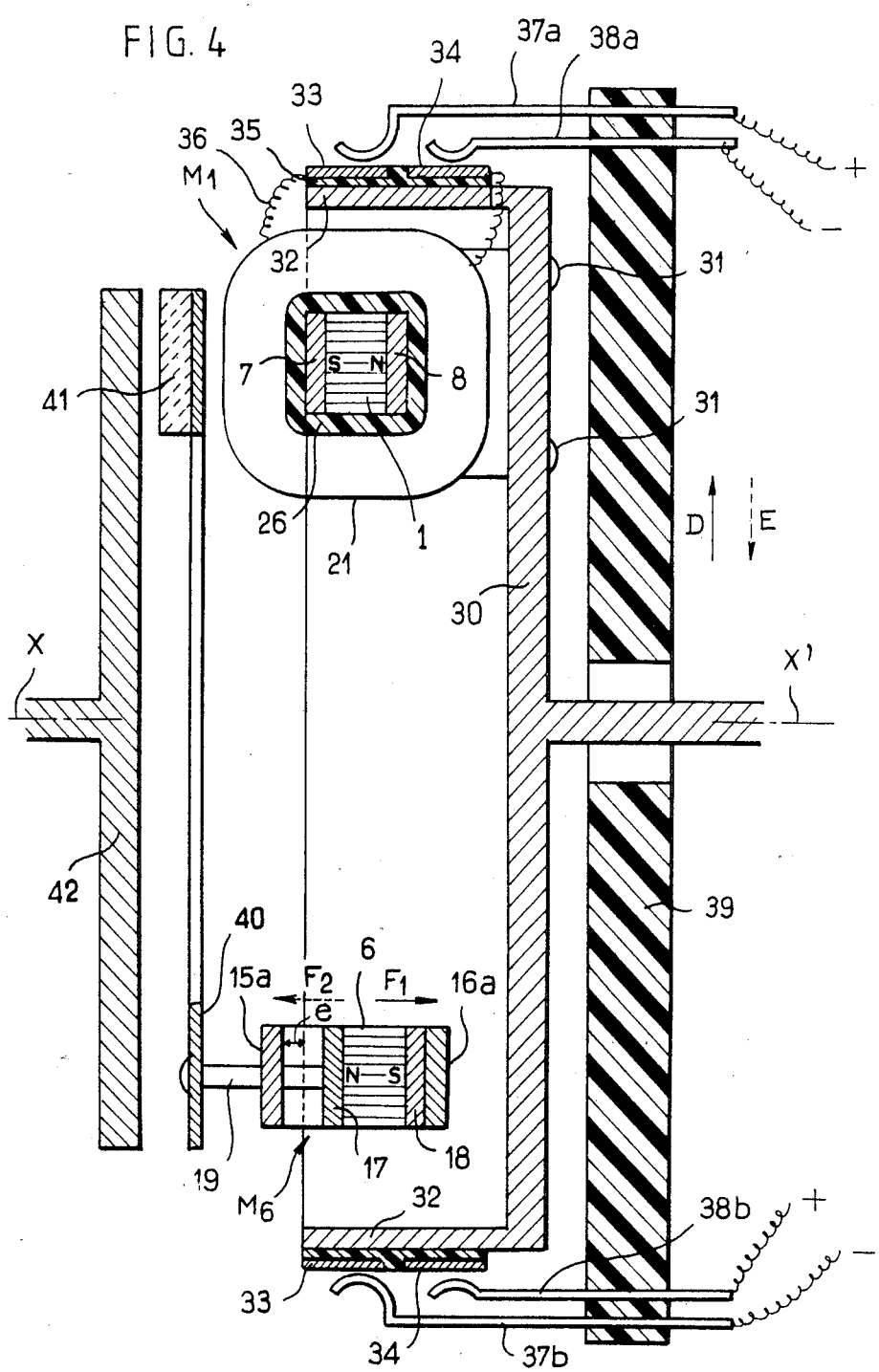

In the accompanying drawings given by way of non-limitative example:

FIG. 1 is a perspective view of an electromagnet in the form of a chain according to the invention, the various links of this chain being, for purposes of clarity, shown separate from each other, FIG. 2 is a cross-sectional view on an enlarged scale, perpendicular to the plane of the chain, of three assembled links of the latter, FIG. 3 is an elevational view of the three assembled links shown in FIG. 2, FIG. 4 is a cross-sectional view on the axis of an electromagnetic clutch, controlled by an electromagnet in the form of a chain according to the invention.

Figure 5:
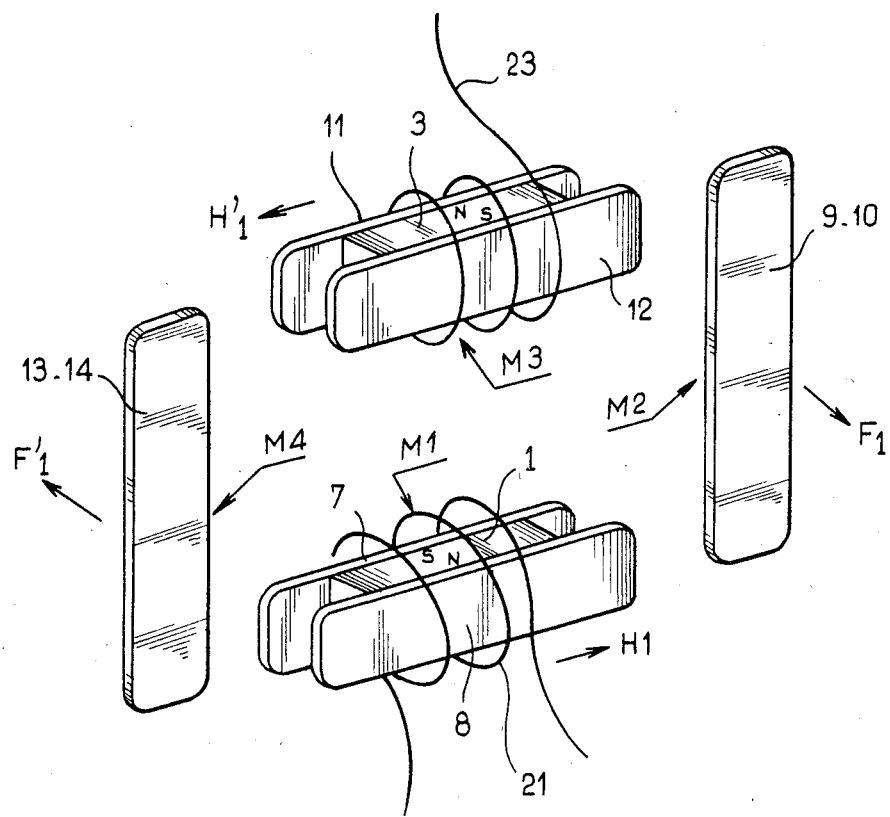

FIG. 5 is a view similar to FIG. 1, of a simplified embodiment of the chain.

In the embodiment of FIGS. 1 to 3, the electromagnet according to the invention has the form of a chain whose magnetic circuit is constituted by a series of pairs of links (M1-M2, M3-M4, M5-M6) associated with each other in such a manner as to provide a closed loop.

Each link M1, M2, M3, M4, M5, M6 comprises a permanent magnet 1, 2, . . . 6 provided on its pole faces perpendicular to its axis with two pole pieces 7, 8; 9, 10; 11, 12; 13, 14; 15, 16; 17, 18 bordering each side of the axis of the corresponding magnet.

In FIG. 1, the links M1, M2 . . . M6 have identical magnets and pole pieces.

On one side of the magnet, the ends 7a, 8a; 9a, 10a, . . . 17a, 18a of the pole pieces 7, 8; 9, 10; . . . 17, 18 are bent in bayonnet fashion which is to say they depart from the plane of the pole faces of the magnets 1, 2, . . . 5, 6 such that these ends 7a, 8a . . . 17a, 18a may engage with predetermined play: e=e1+e2 (see FIG. 2) on the adjacent unbent ends 9b, 10b, . . . 17b, 18b, 7b, 8b of the neighboring links M2 . . . M6 and M1.

The connection between the various links M1, M2, . . . M6 is provided by means of nonmagnetic pins such as 19, 20 engaged in holes provided on the ends 7a, 8a; 9b, 10b; . . . 17a, 18a; 7b, 8b engaged with each other such that the various links M1, M2 . . . M6 are articulated on each other about axes perpendicular to the plane of the closed loop which they form.

The permanent magnets 1, 2, 3 . . . 5, 6 have polarities S, N which have opposite directions for adjacent links such as M1 and M2, . . . M5 and M6.

Furthermore, the alternate links, which is to say M1, M3 and M5 are surrounded by winding 21, 23, 25 shown schematically in FIG. 1 and disposed in a casing of plastic material such as 26 (see FIGS. 2 and 3).

In FIG. 2, it is seen that the pin 19 which assembles the link M1 to the link M2 has a central shouldered portion 19a whose length corresponds to the width of the magnet 2 such that its ends bear against the pole faces 9 and 10. The portions of the pin 19 located on opposite sides of the central shouldered portion 19a are inserted in holes provided in the pole pieces 9 and 10, but can turn freely in the holes provided in the bent ends 7a 8a of the link M1.

Furthermore, the pin 20 which assemblies the links M2 and M3 has a central shouldered portion 20a whose width corresponds to the distance between the bent ends 9a and 10a of pole pieces 9 and 10 of link M2. This central shouldered portion 20a may turn freely in the holes provided in the pole pieces 11 and 12 of the link M3. The portions of the pin 20 located on opposite sides of the shouldered portion 20a are inserted in holes provided in the bent ends 9a and 10a of link M2.

The operation of the electromagnet of chain form just described is as follows (see FIG. 2).

When the windings 21, 23 are excited by the field $H_1$, a magnetic flux is generated in the pole pieces along the arrows shown in full line and the link M2 between the links M1 and M3 surrounded by the windings and maintained fixed relative to a plane P is subjected to a force $F_1$ parallel to the pins 19, 20. The link M2 undergoes translatory movement along $F_1$ of an amplitude corresponding to the predetermined play e. The same is true for all the even numbered links of the chain, such as links M4 and M6 which are bounded by links surrounded by windings. Thus all the even numbered links will simultaneously move in the direction $F_1$.

Conversely, when the windings 21, 23 are excited by the field $H_2$ in the opposite direction, a magnetic flux is engendered in the pole pieces along the arrows shown in dotted lines and the link M2 as well as the even links are subjected to a force $F_2$ directed in the opposite direction from the force $F_1$.

The electromagnet according to the invention thus has a bistable operation. It is particularly to be noted that each air gap is enclosed by permanent magnets upstream and downstream of the flux flow.

It will also be seen that the direction of flux flow in each chain reverses when the direction of excitation of the windings is changed.

Furthermore, it will be understood that, thanks to the articulated connections between the links, the closed loop comprised by the electromagnet may adapt itself to various shapes.

The links M1, M2, . . . M6 instead of being identical may be different as is further shown in FIGS. 2 and 3 which show particularly that the odd links such as M1 and M3 surrounded by a winding are longer than the even links. Moreover, the even links such as M2 preferably have as shown in FIG. 3, pole pieces 9 and 10 whose opposite ends are arcs of a circle, the arc of circle formed on the end 9a or 10a having a smaller diameter than that formed on the opposed end.

This arrangement permits relative rotation of the links along an extended angular section. Moreover, the ends 7a and 8a of link M1 are pointed so as to obtain identical air gap surfaces between the portions engaged within each other of the various links.

Alternatively, the links could be connected to each other about fixed angles, for example to comprise a rectangular or any other fixed or variable geometric figure.

Moreover, the movable links such as M2 or M4 could be made fixed and guided by an axle perpendicular to the plane of fixation.

On the other hand, the windings could also be disposed on the even links such as M2, M4 and M6, so as to prevent play of the assembly to permit the translatory movement perpendicular to the plane of the loop formed by the electromagnet. In such an electromagnet, the distribution of the ampere turns would be very close to the ideal configuration of a torus. However, in the case of the embodiment shown, comprising one winding for two links, the situation is already much more favorable than in the case of a known electromagnet in which the flux return is effected with loss of flux by a yoke not subjected to the ampere turns.

Alternatively, the pole pieces could also be bent inwardly of the chain of the electromagnet, if the permanent magnets were higher.

On the other hand, the links of a given series for example even, could be formed by means of completely flat pole pieces, while the pole pieces of the other links would then be bent at their two opposite ends.

Moreover, in another modification, only one of the two pole pieces of a link would be bent inwardly or outwardly of the chain formed by the electromagnet.

The permanent magnets can be of magnetic rubber given that there are provided in the electromagnet according to the invention, relatively large surfaces for these magnets.

The electromagnet according to the invention can be used in numerous industrial applications.

Thus, the electromagnet in the form of a chain may be disposed in any kind of closed path located in a plane.

For example, this electromagnet can be used to hold by its edges a piece of textile material of variable shape, while there is performed on this piece a given work operation.

The electromagnet can also be arranged in a circular path so as to be able to distribute in a regular fashion forces on a toric sealing joint. Such a regular distribution of the forces is difficult to achieve in the case of a known electromagnet which engenders only a force at the center of such a toric joint.

Another application can be envisaged to control circuit breaker poles of variable number, each pole being constituted by a hermetic chamber provided with electrical connections for a one-phase contact and magnetic connections to actuate an even link located in the hermetic chamber and carrying a movable contact.

On the other hand, if the windings of the links are fed by periodic impulses in alternate directions of a given frequency, there will be engendered a vibratory movement which may be utilized for example to sort articles or to effect agitation.

Furthermore, in the case of monostable clutches with a central electromagnet, there is the problem of conducting current to the turning winding. It is necessary for this purpose to use current feed rings which necessarily give rise to heating and which inevitably become worn.

This difficulty is solved by means of the electromagnet in the shape of a chain according to the invention.

Thus, in the embodiment of FIG. 4, there is shown a clutch provided with an electromagnet in the shape of a chain according to the invention.

Entirely about the driving plate 30 of the clutch are secured, for example by means of rivets 31, all the odd links M1, M3, M5 provided with a winding. For clarity of the drawing, only the link M1 surrounded by winding 21 has been shown.

About a cylindrical flange 32 secured to the periphery of plate 30 and surrounding the links of the electromagnet, are secured two parallel rings 33 and 34 concentric to the axis X-X' of the clutch. These rings are insulated from the flange 32 by means of an insulating layer 35 and are electrically connected to the winding 21 by means of wires 36.

Facing the rings 33, 34 are disposed, in diametrically opposed fashion, two pairs of brushes 37a, 38a; 37b, 38b secured to a plate of insulating material 39 parallel to the plate 30.

When this plate 39 is moved in the direction E, the brushes 37a, 38a are brought into contact with the rings 33, 34, which results in excitation of the windings such as 21 which encircle the odd links such as M1.

Conversely, when the plate 39 is moved in the reverse direction D, the brushes 37b, 38b whose polarities are opposite to the two other brushes, are brought into contact with the rings 33, 34 and the windings of the odd links such as M1 are excited in an opposite direction.

The movable links such as M6 disposed between the odd links are secured by means of their pins such as 19 to a resilient ring 40, for example of bronze, coaxial with axis X-X' and located opposite the plate 30 relative to links M1 . . . M6.

Ring 40 carries facing each odd link such as M1, a friction lining 41. Facing this ring 40 from the side of the linings 41, is disposed a disc 42 coaxial with X-X' serving in the clutch as the driven plate.

The operation of this clutch is the following:

When the plate 39 is momentarily moved in the direction E, the windings of the links such as M1 are energized in a direction such that the axles such as 19 of the movable links such as M6 move in the direction $F_2$. The resilient ring 40 deforms so as to press the linings 41 against the disc 42, which effects clutching between the driving plate and the driven plate.

Declutching is effected by momentarily moving the plate 32 in the reverse direction D, which gives rise to a force $F_1$.

Relative to known electromagnetic clutches, the clutch described above has the advantage of comprising neither a return spring nor a clutching abutment. Moreover, there is no permanent current consumption, nor erosion of the brushes given that these latter bear against the corresponding rings only during the duration of the unclutching or the clutching.

Alternatively, the wear of the linings 41 is compensated by flexure of the crown 40. This clutch need comprise only a single pair of brushes such as 37a and 38a with a view toward a device permitting reversing the polarities of these latter.

Of course, the number of links M1, . . . M6 may be increased or decreased according to the size of the clutch.

Without departing from the scope of the invention, it is possible to simplify the chain formed by the links by omitting magnets 2, 4, 6 . . . of the even links. This leads to FIG. 5, analogous to FIG. 1, but with only four links M1 to M4.

In this figure, it will be seen that the link M1 is identical to link M1 of FIG. 1, except for the pole pieces 7 and 8 which are flat, without bayonnet bending at one of their ends. Moreover, the link M2 is constituted by a simple flat plate 9, 10 of a shape similar to that of pole pieces 9 and 10 of link M2 in FIG. 1. The link M3 is identical to link M1, as is M4 to M2. The ends of the plates 9, 10 and 13, 14 enter respectively between the ends of the pole pieces 7 and 8, and 11 and 12. A field $H_1$ of the winding 21 and $H'_1$ of the winding 23 gives a force F1 on the plate 9, 10, here directed forwardly in the figure and a force F'1 on the plate 13, 14, directed rearwardly of the figure. These forces are therefore now opposed, and it is necessary to have an even number of pairs of links. Moreover, an air gap is no longer surrounded by two permanent magnets, but the embodiment of this chain is simplified.

Of course, the invention is not limited to the examples that have been described and numerous modifications may be effected in these without departing from the scope of the invention.

I claim:

1. Bistable electromagnet whose magnetic circuit, partially surrounded by a winding is constituted by a series of links (M1, M2, M3, M4, M5, M6) interconnected by air gaps, the links of a first type being movable relative to the other links of a second type, certain types of links comprising a permanent magnet (1, 3, 5, . . .) provided on its pole faces with pole pieces (7, 8; 11, 12; 15, 16; . . . ) whose ends define two air gap zones with the neighboring links of the other type, each air gap zone being adapted to engender alternatively two opposite forces whose directions are parallel to the magnetic directions of the permanent magnets, two forces engendered simultaneously by a same link after excitation in a given direction of the winding being of the same direction, characterized in that each permanent magnet (1, 3, 5) of one type of link (M1, M3, M5) is subjected to the influence of a winding (21, 23, 25) whose field is perpendicular to the magnetic direction of said permanent magnet and directed toward one or the other of the ends of the pole pieces (7, 8; 11, 12; 15, 16) with which this magnet is provided, such that the electromagnet will have the shape of a closed chain, adapted to follow a variable path in a plane P and being able to create, lengthwise of its extent, forces F1, F2 perpendicular to this plane.

2. Electromagnet according to claim 1, characterized in that the fixed links (M1, M3, M5) of the second type each comprise a permanent magnet (1, 3, 5) provided with pole pieces (7, 8; 11, 12; 15, 16) and surrounded by a winding (21, 23, 25).

3. Electromagnet according to claim 2, characterized in that the movable links of the first type (M2, M4, M6) also each comprise a permanent magnet (2, 4, 6) provided with pole pieces (9, 10; 13, 14; 17, 18) such that each air gap will be enclosed by a magnet upstream and downstream with relation to the direction of the magnetic flux.

4. Electromagnet according to claim 1, characterized in that the movement of the movable links is guided by nonmagnetic pins (19, 20) traversing the ends (7a, 8a; 9b, 10b; . . . ) facing the pole pieces of the links of different type.

5. Electromagnet according to claim 3, characterized in that the pole pieces (7, 8; 9, 10, . . . ) of a link are identical.

6. Electromagnet according to claim 5, characterized in that the pole pieces (7, 8; 9, 10; . . . ) of links of different order (M1, M2 . . . ) are identical.

7. Electromagnet according to claim 5, characterized in that the pole pieces (7, 8; 9, 10; . . . ) of a link are bent so as to improve the fitting of these pieces on the ends (7a, 8a; 9a, 10a, . . . ) bordering one side of the magnet (1, 2, . . . ).

8. Electromagnet according to claim 1, characterized in that it is mounted on a plate (30) or the like turning about an axis of rotation (X-X') and in that the windings (21, . . . ) of the links (M1, . . . ) are electrically connected to rings (33, 34) concentric with said axis and connected to means (37a, 38a; 37b, 38b, 39) permitting exciting the windings (21, . . . ) in a predetermined direction or the reverse thereof so as to engender a force ($F_1$, $F_2$) in the direction of the axis (X-X').

9. Electromagnet according to claim 8, characterized in that said plate (30) is the drive plate of an electromagnetic bistable clutch at the periphery of which are secured the links (M1, . . . ) surrounded by a winding (21, . . . ), in that the movable links (M6, . . . ) are secured to a resilient crown (40) carrying friction linings (41) disposed facing the driven plate (42) of the clutch, such that said force ($F_1$, $F_2$) will have the effect of applying said linings (41) against the driven plate (42) or to move them away therefrom, according to the direction of excitation of the windings (21, . . . ).

10. Electromagnet according to one of claims 8, characterized in that the means permitting exciting the windings comprise brushes (37a, 38a; 37b, 38b) connected to means (39) adapted to bring them selectively into contact with the rings (32, 34).

11. Electromagnet according to claim 1, characterized in that the windings (21, 23, 25) are fed by periodic pulses of alternate direction, so as to obtain a vibratory movement.

12. Electromagnet according to claim 1, characterized in that it comprises links (M1, M3) whose pole pieces (7, 8; 11, 12) are flat and surrounded by a winding (21, 23) and links (M2, M4) connected to the ends of the links (M1, M3) and constituted by simple flat plates (9, 10; 13, 14), and in that there is a number of pairs of links (M1, M2; M3, M4 . . . ).

* * * * *